United States Patent [19]
Wada

[11] Patent Number: 5,138,554
[45] Date of Patent: Aug. 11, 1992

[54] SUSPENSION CONTROLLER

[75] Inventor: Shunichi Wada, Himeji, Japan

[73] Assignee: Mitsubishi Denki K.K., Tokyo, Japan

[21] Appl. No.: 504,516

[22] Filed: Apr. 4, 1990

[30] Foreign Application Priority Data

Apr. 22, 1989 [JP] Japan ................................. 1-102819

[51] Int. Cl.$^5$ ............................................. B60G 17/00
[52] U.S. Cl. ................................ 364/424.05; 280/707; 280/840
[58] Field of Search ....................... 364/424.05, 426.02, 364/426.04; 280/840, 707; 395/905

[56] References Cited

U.S. PATENT DOCUMENTS

| | | | |
|---|---|---|---|
| 4,803,627 | 2/1989 | Yasuike et al. | 364/424.05 |
| 4,809,175 | 2/1989 | Hosaka et al. | 364/426.02 |
| 4,907,154 | 3/1990 | Yasuda et al. | 364/424.05 |
| 4,916,632 | 4/1990 | Doi et al. | 364/424.05 |
| 4,930,084 | 5/1990 | Hosaka et al. | 364/426.04 |
| 5,001,640 | 3/1991 | Matsumoto et al. | 364/426.02 |

*Primary Examiner*—Gary Chin
*Attorney, Agent, or Firm*—Sughrue, Mion, Zinn, Macpeak & Seas

[57] ABSTRACT

In the suspension controller of the present invention, there is provided a suspension or stabilizer characteristic change-over determining device whereby a damping force or a spring constant of a suspension or a torsional force of a stabilizer is calculated from a degree of similarity corresponding to a physical amount which exerts influence on the suspension or stabilizer characteristics and a state amount, using fuzzy logic, and when it is enhanced, this enhanced state of the suspension or the stabilizer is maintained for a set time. If during this period a set value of the damping force or the spring constant or the torsional force corresponding to the output which is responsive to the degree of similarity indicates a rather low state for a predetermined time or longer, the value of the damping force or the spring constant or the torsional force is set low and this state is maintained for a set time. There is also provided a suspension or stabilizer characteristic change-over operating device which is controlled by the change-over determining device and controls the characteristics of the suspension or the stabilizer in a variable manner.

2 Claims, 3 Drawing Sheets

SUSPENSION CONTROLLER

BACKGROUND OF THE INVENTION

1. FIELD OF THE INVENTION

The present invention relates to a suspension controller which determines optimal characteristics of a suspension and a stabilizer for a vehicle body by controlling factors influencing the suspension and stabilizer characteristics, using a fuzzy controller.

2. DISCUSSION OF BACKGROUND

Conventional suspension controllers make a digital judgment using certain values in the discrimination of such subjective and vague factors as driving stability and comfortableness which exert influence on the characteristics of a suspension and a stabilizer for a vehicle body.

In such conventional suspension controllers, since subjective and vague factors are discriminated digitally using certain values, the judgment of the suspension and stabilizer characteristics has been unsatisfactory.

SUMMARY OF THE INVENTION

The present invention has been accomplished for overcoming the above-mentioned problem and it is the object thereof to provide a suspension controller capable of judging automatically and almost in an analog manner which of comfortableness and stability is to be satisfied which judgment is difficult humanly, capable of preventing unnecessary hunting of the actuator, capable of anticipating the movement of a vehicle body as a fuzzy variable and easily detecting a physical amount both through an instantaneous state detecting means, and capable of making a finer control using a small number of control rules.

In the suspension controller of the present invention, there is provided a suspension or stabilizer characteristic change-over determining means whereby a damping force or a spring constant of a suspension or a torsional force of a stabilizer is calculated from a degree of similarity corresponding to a physical amount which exerts influence on the suspension or stabilizer characteristics and a state amount, using the fuzzy rule, and when it is enhanced, this enhanced state of the suspension or the stabilizer is maintained for a set time; and if during this period a set value of the damping force or the spring constant or the torsional force corresponding to the output which is responsive to the degree of similarity indicates a rather low state for a predetermined time or longer, the value of the damping force or the spring constant or the torsional force is set low and this state is maintained for a set time; and there is also provided a suspension or stabilizer characteristic change-over operating means which is controlled by the said change-over determining mean and controls the characteristics of the suspension or the stabilizer in a variable manner.

The suspension or stabilizer characteristic change-over determining means used in the present invention calculates the degree of similarity corresponding to a physical amount or a state amount, using the fuzzy rule, then calculates a requirement signal for comfortableness and driving stability of a vehicle body on the basis of the said degree of similarity, then combines requirement indices corresponding to individual physical amounts and state amounts, poises the results, and calculates a damping force or a spring constant of the suspension or a torsional force of the stabilizer. And it is controlled so that when an enhanced state of such damping force or spring constant or torsional force is maintained, and if thereafter a set value of the damping force or spring constant or torsional force corresponding to the degree of similarity indicates a rather low state for a predetermined time or longer, the value of the damping force or spring constant or torsional force is set low and this low state is maintained for a set time.

DETAILED DESCRIPTION OF A PREFERRED EMBODIMENTS

An embodiment of the suspension controller of the present invention will be described hereinafter with reference to the accompanying drawings.

Figure 1:
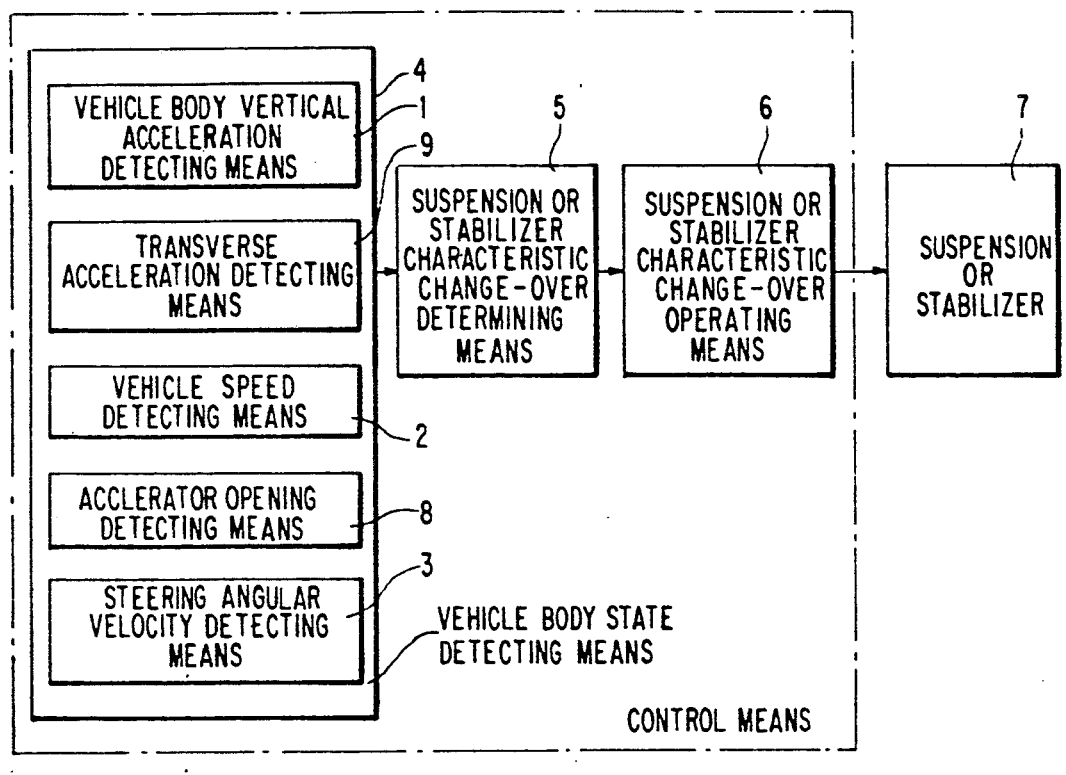
FIG. 1 is a block diagram of a suspension controller according to an embodiment of the present invention.

In FIG. 1, which is a block diagram showing the construction of this embodiment, the change-over of characteristics of a suspension or a stabilizer is performed by a control means S. The control means S comprises a vehicle body state detecting means 4, a suspension or stabilizer characteristic change-over determining means 5 and a suspension or stabilizer characteristic change-over operating means 6. Control is made by the control means S for the change-over of characteristics of a suspension or a stabilizer 7.

The vehicle body state detecting means 4 comprises means 1 for detecting a vertical acceleration of a vehicle body, a vehicle speed detecting means 2, a steering angular velocity detecting means 3, an accelerator opening detecting means 8 and means 9 for detecting a transverse acceleration. The control means S, particularly the suspension or stabilizer characteristic change-over determining means 5 and the suspension or stabilizer characteristic change-over operating means 6, as described above, can be implemented in several different manners using hardware or a combination of hardware and software. For example, the control means S could include a software controlled microcomputer. In this instance, the microcomputer is programed to output signals to control the characteristics of the suspension or stabilizer 7 in response to the outputs of the detecting means in accordance with the flow chart illustrated in FIG. 2.

Figure 2:
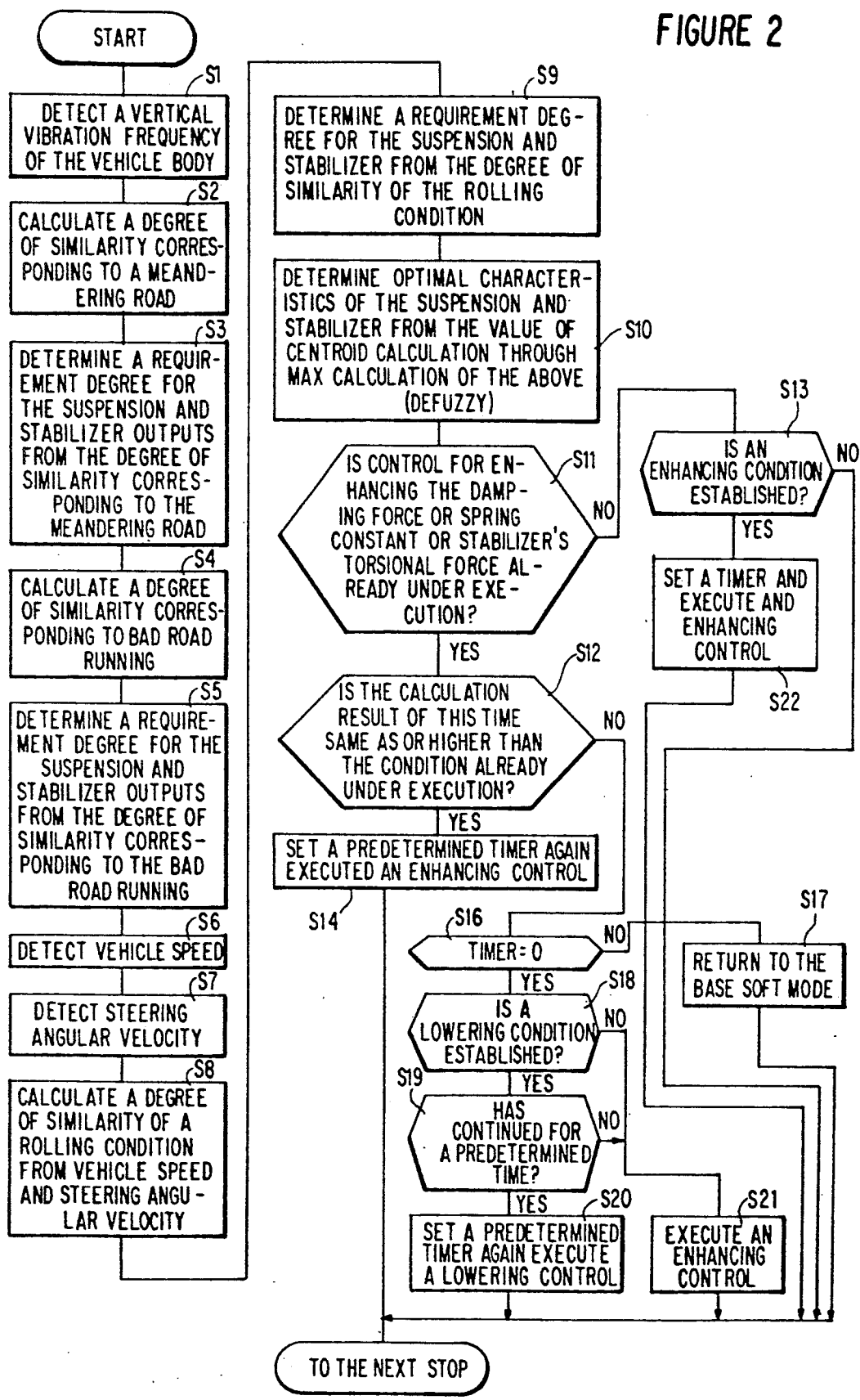
FIG. 2 is a flowchart showing the flow of operations of a suspension or stabilizer characteristic change-over determining means used in the above embodiment.

The operation of the suspension or stabilizer characteristic change-over determining means will be described below in accordance with the flowchart of FIG. 2.

First, in step S1, a vertical vibration frequency of the vehicle body is detected. More specifically, the magnitude of each vertical vibration of the vehicle body and the vibration frequency are detected by the vertical acceleration (sometimes referred to as "G" hereinafter) detecting means 1 for the vehicle body shown in FIG. 1, and a vibration larger than a predetermined magnitude is divided into plural regions for discrimination.

Figure 3:
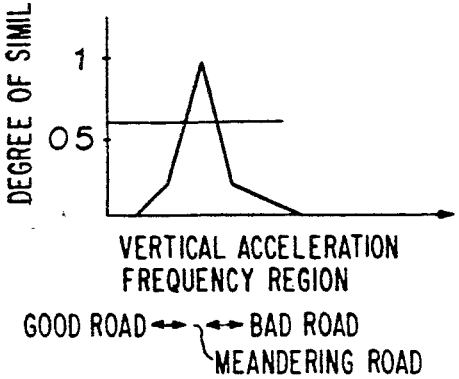
FIG. 3 is an explanatory view of a first half portion of a membership function which represents a meandering road for explaining the above embodiment.

Next, in step S2, using fuzzy logic, the degree of similarity between the vertical G frequency region as a fuzzy variable and a meandering road is calculated from the first half portion of the fuzzy rule, as shown in FIG. 3. The frequency region indicating a peak of a function (or a map) of this similarity degree corresponds to the region of a spring resonance frequency of the vehicle body and it is 1 to 2 Hz, for example.

Figure 4:
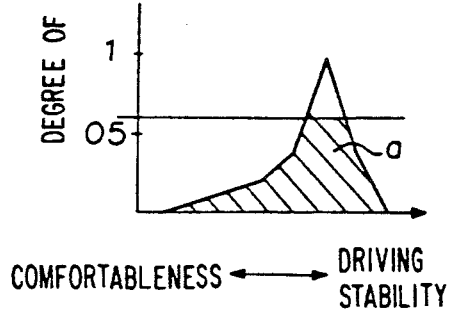
FIG. 4 is an explanatory view of a latter half portion of the said membership function.

In step S3, as shown in FIG. 4, a maximum value of a membership function in the latter half portion of the fuzzy rule is defined from the degree of similarity obtained in step S2 to determine the area a of the hatched portion, and a requirement index for the comfortableness and driving stability of the vehicle body is calculated in an analog manner.

On the comfortableness side, the damping force and the spring constant are of low values and the torsional force of the stabilizer is weakened, while on the driving stability side, they are of values reverse thereto.

Figure 5:
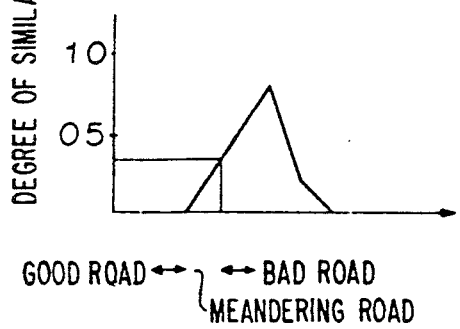
FIG. 5 is an explanatory view of a first half portion of a membership function which represents a bad road for explaining the above embodiment.

Then, in step S4, a degree of similarity corresponding to a bad road is calculated from the first half portion of the fuzzy rule shown in FIG. 5 on the basis of the magnitude of the vertical vehicle body vibration and the vibration frequency which were obtained in step S1 and using the fuzzy rule. The frequency region which represents a peak of this similarity degree corresponds to a non-spring resonance region of the vehicle body and it is 10 to 20 Hz, for example.

Figure 6:
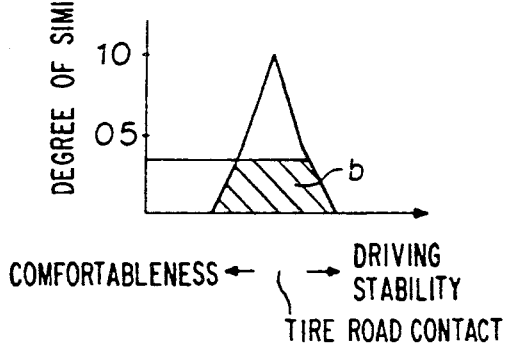
FIG. 6 is an explanatory view of a latter half portion of the said membership function in FIG. 5.

Next, in step S5, as shown in FIG. 6, a maximum value of the membership function in the latter half portion of the fuzzy rule is defined from the degree of similarity obtained in step S4 to determine the area b of the hatched portion, and a requirement index for the comfortableness and driving stability of the vehicle body or the road contact of the tires are calculated in an analog manner.

Then, in step S6, a vehicle speed is detected by the vehicle speed detecting means shown in FIG. 1.

Next, in step S7, a steering angular velocity is detected by the steering angular velocity detecting means 3 shown in FIG. 1.

Figure 7:
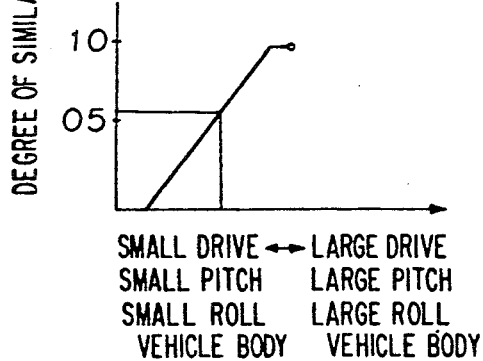
FIG. 7 is an explanatory view of a first half portion of a membership function which represents a rolling condition for explaining the above embodiment.

Then, in step S8, a rolling condition of the vehicle body is detected from the thus-detected vehicle speed and steering angular velocity, and a degree of similarity corresponding to the rolling condition of the vehicle body is calculated from the first half portion of the fuzzy rule, as shown in FIG. 7.

Figure 8:
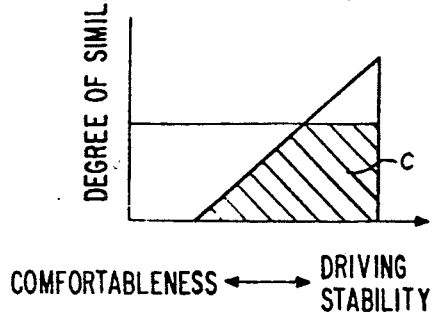
FIG. 8 is an explanatory view of a latter half portion of the said membership function in FIG. 7.

Next, in step S9, as shown in FIG. 8, a maximum value of a membership function in the latter half portion of the fuzzy rule is defined from the degree of similarity obtained in step S8 to determine the area c of the hatched portion, and a requirement index for the comfortableness and driving stability of the vehicle body are calculated in an analog manner.

In the above steps S8 and S9, the combination of the vehicle speed and the steering angular velocity is divided into plural regions, as a fuzzy variable, then the degree of similarity between the fuzzy variable and the rolling condition of the vehicle body is calculated, and a requirement index for comfortableness and driving stability of the vehicle body are calculated in an analog manner. But, the degree of similarity in the rolling condition or in acceleration or deceleration can be calculated in a similar manner using the rules of FIGS. 7 and 8 as they are.

The following method can also be adopted. The combination of the vehicle speed and a transverse acceleration is divided into plural regions, as a fuzzy variable, then the degree of similarity between the fuzzy variable and the rolling condition of the vehicle body is calculated from FIG. 7, and a requirement index for the comfortableness and driving stability of the vehicle body are calculated in an analog manner from FIG. 8.

Further, the following method is adoptable. An acceleration or deceleration of the vehicle body is calculated from a differential value of the vehicle speed, as a fuzzy variable, then the degree of similarity between the fuzzy variable and the change of posture in the longitudinal direction of the vehicle body is calculated from FIG. 7, and a requirement index for the comfortableness and driving stability of the vehicle body is calculated in an analog manner from FIG. 8.

Also, by using the output value of a longitudinal acceleration/deceleration sensor (not shown) directly as a fuzzy variable, similar calculations can be performed from FIGS. 7 and 8.

According to a further method which may be used, the combination of the vehicle speed and a signal indicative of an accelerator opening or closing is used as a fuzzy variable, then the degree of similarity between the fuzzy variable and the change of posture in the longitudinal direction of the vehicle body is calculated from FIG. 7, and a requirement index for the comfortableness and driving stability of the vehicle body is calculated in an analog manner from FIG. 8.

Although in steps S8 and S9 there was obtained only one requirement index by analog calculation, it goes without saying that plural requirement indices may be obtained by such calculation.

Figure 9:
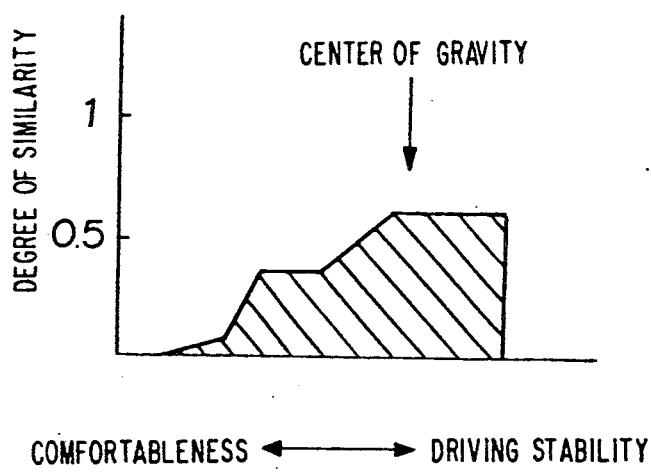
FIG. 9 is an explanatory view of a membership function which represents the results of a final argument.

Next, in step S10, as shown in FIG. 9, the area a of the membership function determined in step S3, the area b of the membership function determined in step S5 and the area c of the membership function determined in step S9 are MAX-combined, thereby determining an index of the damping force or spring constant or the stabilizer's torsional force for realizing the comfortableness and driving stability of the vehicle body. Then, according to the index thus determined there is calculated a value (defuzzy value) of the damping force or spring constant or the stabilizer's torsional force.

Then, in step S11, judgment is made as to whether a control for enhancing the damping force or spring constant or the stabilizer's torsional force has already been executed or not, and if the answer is affirmative, the program proceeds to step S12, while if the answer is negative, the program shifts to step S13.

In step S12, judgment is made as to whether the result of calculation obtained this time is the same as or higher than the condition already under execution. If the answer is affirmative, the program proceeds to step S14, in which the value of a predetermined timer is set again according to a delay time. And if the calculation result of this time is the same as the condition already under execution, the control is continued, while if an enhancing condition exists, the control is changed to an enhancing control, then the flow passes to step S15.

On the other hand, if the answer in step S12 is negative, then in step S16, judgment is made on the basis of the value on the timer as to whether the value is still within the control-holding time or not. If the operation of the timer has terminated, the flow returns in step S17 to a base soft or intermediate mode applied when there exists no condition.

If in step S16 a hard (H) damping force or any other hard suspension characteristic is held, the program proceeds to step S18, and when the value of, for example, the damping force determined from the result of centroid calculation in the subsequent step S19 is "M"(medium) lower than the value in the present control, judgment is made in step S19 as to whether this calculation result has been being continued for a predetermined time or longer, and if the answer is affirmative, the program proceeds to step S20.

In step S20, the hardness characteristic of the suspension or the stabilizer now under control is changed from high to low, and after setting a predetermined timer again, the program proceeds to step S15.

If the answer in step S18 or S19 is negative, the flow shifts to step S21 to continue the hard control.

Further, in step S13, there is made judgment as to whether an enhancing condition was established this time or not, and if the answer is affirmative, the timer is set in step S22 and an enhancing control is executed, while if the answer is negative, the program proceeds to step S15 without making any control.

Also, control may be made in the following manner. When each or any of the suspension's damping force or spring constant or the stabilizer's torsional force is changed over in three or more stages, e.g. S (soft), M, H, HH, and when the characteristic is enhanced to H or HH, this state is maintained for a set time. Where during this set time a calculated value on the suspension or the stabilizer corresponding to the result of subsequent calculation of the degree of similarity is changed to the base S or M and thereafter H or M higher than the base and lower than the present value was indicated a predetermined number of time or more, the setting is changed over to H or M and this low state is maintained for a set time.

Thus, in the above embodiment the fuzzy rule is introduced in the suspension control, whereby even when an unstored control condition is inputted, the similarity thereof to an already existing rule is judged "analogwise"(i.e., in an analog manner) and an optimal control rule is automatically searched and outputted on the basis of the results obtained from plural control rules with respect to the degree of similarity, so a fine or more delicate control can be realized using a small number of control rules.

Further, since similarity degrees of plural control rules are combined and a centroid calculation is made for the results obtained, which of comfortableness and driving stability is to be satisfied can be judged automatically and in an analog manner using consecutive values.

Moreover, once the damping force or the spring constant or the stabilizer's torsional force is enhanced in accordance with the results of calculation made according to the fuzzy rule, the hard state of the suspension is maintained for a predetermined time, so even when state detection signals on the vehicle body are intermittent repeatedly or appear instantaneously and disappear in a short time, it is possible to prevent frequent changes of the suspension characteristic and a high driving stability can be expected.

Further, even while an enhanced state of the damping force or suspension characteristic is maintained, if the result of a subsequent centroid calculation from a newly calculated degree of similarity is lowering the value of the damping force or the spring constant or the stabilizer's torsional force and this calculation result is maintained for a predetermined time, the value of the suspension is changed to a lower value and the changed state is maintained, so a finer control for the suspension characteristics can be realized without hunting and with satisfactory response characteristic.

Moreover, using the frequency of a vertical acceleration of the vehicle body as a fuzzy variable and also using a degree of similarity having a peak in the region of a spring resonance frequency of the vehicle body, the degree of comfortableness which is a factor depending on the human subjectivity or feeling is judged, so it is possible to expect a suspension control which matches the human delicacy.

Further, also using the frequency of a vertical acceleration of a vehicle body as a fuzzy function and a degree of similarity having a peak in the region of a non-spring resonance frequency of the vehicle body, the badness of the contacting condition of the tires with the road surface is judged, so it is possible to realize a fine contacting condition of the tires with the road surface. For example, even when the road surface condition changes during turn or during acceleration, this condition can be coped with easily by changing the damping force from hard to medium.

Moreover, since a vertical acceleration sensor is used, it can be mounted easily as compared with the use of a vehicle height sensor.

Further, since such a condition as a rolling speed calculated from a handle angular velocity and the vehicle speed is used as a fuzzy variable and the degree of similarity in strength of a rolling angle or a rolling angular velocity is judged substantially in a continuous manner, it is possible to expect a suspension control which more matches the steering operation than in the conventional "0", "1" determination for the damping force using a map.

Moreover, since the condition of rolling determined by the vehicle speed and a transverse acceleration of the vehicle body is used as a fuzzy variable and the degree of similarity in magnitude of a rolling angle or a rolling angular velocity is judged substantially in a continuous manner, it is possible to realize a suspension control which more matches actual turns than in the conventional "0", "1" determination for the damping force, etc. using a map.

Further, since any or all of an output value of the longitudinal G sensor for detecting a longitudinal acceleration of the vehicle body, a differential value of the vehicle speed and a combined value of the vehicle speed and the accelerator opening or closing speed are used as fuzzy variables and similarity degrees which represent indices of comfortableness or driving stability corresponding to the similarity degrees calculated in the same manner as in the case of the fuzzy variables are judged substantially in an analog manner; besides, they are poised, it is possible to realize a more delicate characteristic control for the suspension or the stabilizer than in the conventional determination using each individual condition.

Although in the above embodiment the duration for a predetermined time or longer was measured using a timer, it goes without saying that the same effect can be obtained even by counting the number of times of the establishment of conditions.

According to the present invention, as set forth hereinabove, the degree of similarity of a physical amount which influences the characteristics of a suspension or a stabilizer and a state amount which represents the motion of a vehicle body is calculated using the fuzzy rule, then from this degree of similarity there is calculated damping force or spring constant of the suspension or a torsional force of the stabilizer, which is then enhanced, then the suspension or the stabilizer is maintained in this state for a set time, and if during this period a set value of the damping force or the spring constant or the torsional force corresponding to the output which is responsive to the degree of similarity indicates a low state for a predetermined time or longer, the value of the damping force or the spring constant or the torsional force is set low and this low state is maintained for a set time, so which of comfortableness and driving stability is to be satisfied, for which human judgment is different, can be judged automatically and substantially analogwise, and it is possible to set a priority which is human. Besides, it is possible to prevent unnecessary hunting of the actuator, and also possible to anticipate the movement of the vehicle body as a fuzzy variable and detect a physical amount easily through an instantaneous state detecting means.

Further, it is possible to realize a more delicate suspension characteristic control using a small number of control rules.

What is claimed is:

1. A suspension controller comprising:
   a state detecting means for detecting amounts of physical exertions on a vehicle body which influence characteristics of a vehicle body supporting suspension and stabilizer and a state amount representative of a movement of the said vehicle body;
   a change-over determining means for calculating in accordance with fuzzy logic a degree of similarity corresponding to said amounts of physical exertions and state amount, calculating based on said degree of similarity a requirement index for comfortableness and driving stability of said vehicle body, combining requirement indices corresponding to said amounts of physical exertions and state amount, and calculating a damping force and spring constant of said suspension and a torsional force of said stabilizer based on the combined requirement indices, such that when one of said damping force, spring constant, and torsional force is in a first state, said first state of one of said suspension, and stabilizer is maintained for a first predetermined time, and when a set value of one of said damping force, spring constant, and stabilizer's torsional force corresponding to an output which is responsive to said degree of similarity indicates a second state for at least a predetermined time, said one of said damping force, spring constant, and torsional force is set to said second state and maintained at said second state for a second predetermined time; and
   a suspension operating means responsive to an output of said change-over determining means for controlling characteristics of said suspension and stabilizer in a variable manner.

2. A suspension controller according to claim 1, wherein said state detecting means comprises means for detecting an acceleration in a vertical direction of said vehicle body, means for detecting a vehicle speed, means for detecting a steering angular velocity, means for detecting an accelerator opening, and means for detecting an acceleration in a transverse direction of said vehicle body.

* * * * *